(12) United States Patent
Tzeng

(10) Patent No.: US 9,428,891 B2
(45) Date of Patent: Aug. 30, 2016

(54) VALVE BODY OF A WATER FAUCET

(71) Applicant: DAHATA INC., Jiangmen, Guangdong (CN)

(72) Inventor: Jeffery Tzeng, Jiangmen (CN)

(73) Assignee: DAHATA INC., Jiangmen (CN)

( * ) Notice: Subject to any disclaimer, the term of this patent is extended or adjusted under 35 U.S.C. 154(b) by 0 days.

(21) Appl. No.: 14/578,515

(22) Filed: Dec. 22, 2014

(65) Prior Publication Data
US 2016/0177549 A1   Jun. 23, 2016

(51) Int. Cl.
*E03C 1/04* (2006.01)
*F16K 11/078* (2006.01)

(52) U.S. Cl.
CPC .......... *E03C 1/0403* (2013.01); *E03C 1/0401* (2013.01); *F16K 11/0787* (2013.01); *Y10T 137/9464* (2015.04)

(58) Field of Classification Search
CPC .............. E03C 1/0403; E03C 1/0401; F16K 11/0787; Y10T 137/9464
See application file for complete search history.

(56) References Cited

U.S. PATENT DOCUMENTS

| | | | | |
|---|---|---|---|---|
| 3,229,710 A | * | 1/1966 | Keller, III | F16K 27/0263 137/315.13 |
| 6,405,749 B1 | * | 6/2002 | Bloom | E03C 1/0401 137/359 |
| 7,231,936 B2 | * | 6/2007 | Chang | E03C 1/0403 137/328 |
| 7,927,534 B1 | * | 4/2011 | Seman, Sr. | E03C 1/021 264/250 |
| 8,302,620 B2 | * | 11/2012 | Lin | E03C 1/04 137/315.12 |
| 8,651,132 B1 | * | 2/2014 | Hu | E03C 1/0403 137/315.12 |
| 2010/0096034 A1 | * | 4/2010 | Hou | B29C 45/16 137/801 |
| 2012/0067978 A1 | * | 3/2012 | Leichty | E03C 1/0403 239/417.5 |
| 2012/0097276 A1 | * | 4/2012 | Tzeng | F16K 19/006 137/603 |

* cited by examiner

*Primary Examiner* — Craig Schneider
*Assistant Examiner* — Kevin Barss

(57) ABSTRACT

Provided is a valve body of a water faucet including a water outlet pipe seat and two water valve seats configured to receive a cold water valve cartridge and a hot water valve cartridge respectively at two sides of the water outlet pipe seat. Each valve seat is formed with a water inlet pipe enclosed by a cooper casing pipe. Each valve seat is fixed to a corresponding copper casing pipe via injection molding. The valve body of a water faucet in accordance with the present invention is formed with a copper casing pipe which can be connected to an external water pipe around each water inlet pipe. Therefore, lifespan of the water faucet is prolonged remarkably.

8 Claims, 4 Drawing Sheets

VALVE BODY OF A WATER FAUCET

FIELD OF THE INVENTION

The present invention generally relates to water faucets and, more particularly, to a valve body of a water faucet having a long lifespan.

BACKGROUND OF THE INVENTION

A conventional water faucet generally includes a valve body, a cold water valve cartridge and a hot water valve cartridge. The valve body includes a water outlet pipe seat, a cold water valve seat configured to receive the cold water valve cartridge, and a hot water valve seat configured to receive the hot water valve cartridge. The cold water valve seat and the hot water valve seat each is manufactured vie injection molding and is coupled with a cold water inlet pipe and a hot water inlet pipe defining thread thereon.

However, the external thread of the cold water inlet pipe or the hot water inlet pipe may be damaged in use, which will inevitably shorten lifespan of the water faucet. In addition, a nozzle connecting end of the valve body is configured to be a connector defining external thread, which may adversely affect connection and disconnection of the nozzle.

In view of the foregoing, what is needed, therefore, is to provide a valve body of a water faucet which has a long lifespan.

SUMMARY OF THE INVENTION

One object of the present invention is to provide a valve body of a water faucet which has a long lifespan.

According to one embodiment of the present invention, a valve body of a water faucet includes a water outlet pipe seat and two water valve seats configured to receive a cold water valve cartridge and a hot water valve cartridge respectively at two ends of the water outlet pipe seat. Each valve seat is formed with a water inlet pipe. Each water inlet pipe is formed with a cooper casing pipe set therearound. Each valve seat is fixed to a corresponding copper casing pipe via injection molding.

According to one aspect of the present invention, the copper casing pipe defines an external thread.

According to one aspect of the present invention, each valve seat includes a valve cartridge receiving portion for receiving a valve cartridge and a water inlet pipe in communication with the valve cartridge receiving portion via an inlet hole. An annular cylinder enclosing the water inlet pipe is provided at the juncture of the valve cartridge receiving portion and the water inlet pipe. One end of the copper casing pipe connected to the valve seat is inserted and sandwiched in a space between the annular cylinder and the water inlet pipe.

According to one aspect of the present invention, the copper casing pipe defines at least one radial connecting holes extending through a sidewall thereof at one end thereof connecting with the valve seat. At least one connecting post is seated in a space between the annular cylinder and the water inlet pipe. Number and size of the connecting post are corresponding to number and size of the radial connecting holes in the copper casing pipe. The connecting post extends through the connecting hole, with two ends thereof fixed to the hot water inlet pipe and the annular cylinder respectively.

According to one aspect of the present invention, the copper casing pipe defines at least one radial positioning notch at one end thereof connecting with the valve seat. At least one positioning blocks is correspondingly formed in a space between the annular cylinder and the water inlet pipe. Number and size of the positioning blocks are corresponding to the number and size of the positioning notches of the copper casing pipe, with each positioning block being suitably fitted with a corresponding positioning notch.

According to one aspect of the present invention, the water inlet pipe defines a number of positioning slots at an outer sidewall thereof adjacent to the valve cartridge receiving portion. The copper casing pipe is formed with a number of protrusions on an inner sidewall thereof adjacent to one end thereof configured to connect with the valve seat. Each protrusion is suitably embedded in a corresponding positioning slot.

According to one aspect of the present invention, the valve body of a water faucet further includes a water outlet pipe connecting seat at a middle portion of the water outlet pipe seat. The water outlet pipe connecting seat and the two valve seats are over molded using the water pipe outlet seat and the copper casing pipe as mold insert.

According to one aspect of the present invention, the water outlet pipe seat is coupled with a clip-on nozzle connecting assembly configured for quickly connecting or disconnecting the nozzle.

According to one aspect of the present invention, the water outlet pipe seat is a single injection molded component which includes a joint seat at a middle portion thereof and two water pipes connected to two ends of the joint seat respectively. The nozzle connecting end of the joint seat is formed with a connector defining an internal thread. The nozzle connecting assembly is connected to the connector defining internal thread of the water outlet pipe seat via thread connection and sealed via a seal ring.

According to one aspect of the present invention, the nozzle connecting assembly includes a connecting pipe, a resilient snapping component and a seal ring. One end of the connecting pipe configured to connect the valve seat is secured to the nozzle connecting end of the water outlet pipe seat. The nozzle connecting end of the connecting pipe is provided with a receiving recess and a receiving slot. The resilient snapping component is a C-shaped ring forming two snapping blocks on an outer sidewall thereof. The resilient snapping component is set around the nozzle connecting end of the connecting pipe and is seated in the receiving recess. The seal ring is correspondingly seated in a receiving slot at the nozzle connecting end of the connecting pipe.

Compared with the prior art, the valve body of a water faucet according to the embodiment of the present invention is formed with a copper casing pipe around each water inlet pipe and is connected to an external water pipe via the copper casing pipe. Therefore, damage to the external thread of the water inlet pipe of the valve body of the water faucet is avoided, and lifespan of the water faucet is remarkably prolonged.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
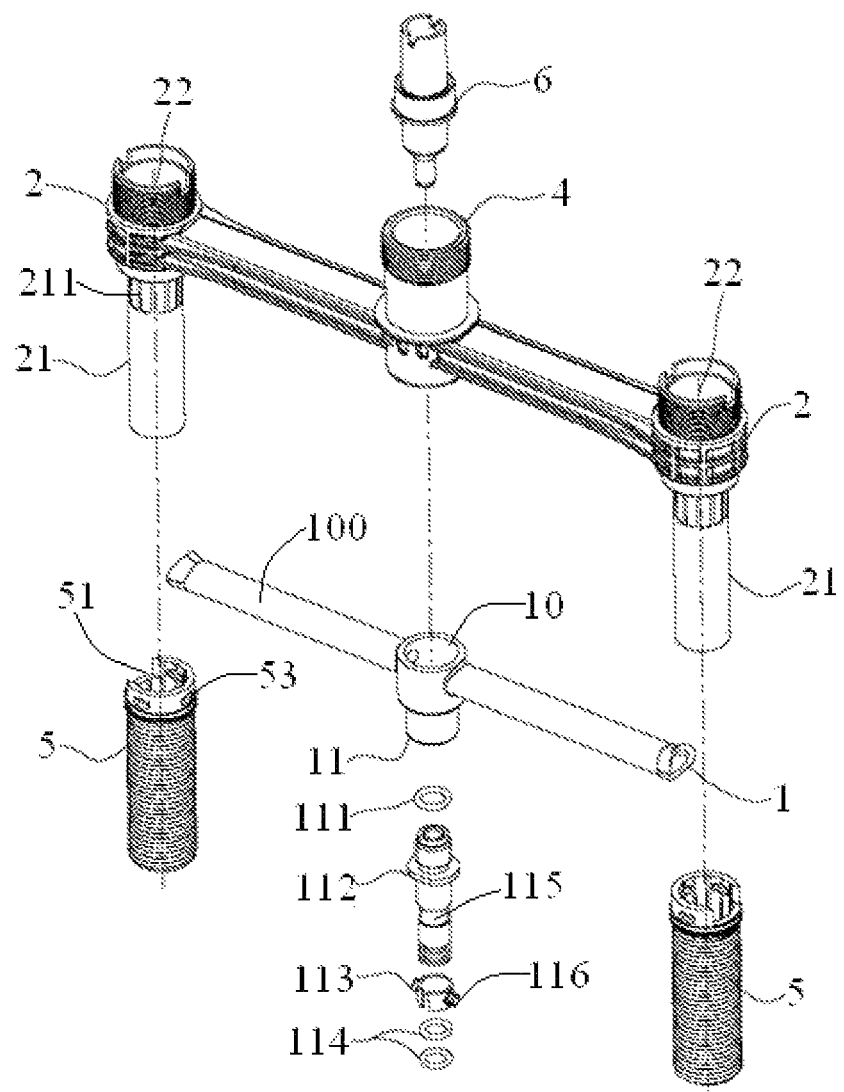
FIG. 1 depicts an exemplary exploded view of a valve body of a water faucet according to one embodiment of the present invention.
Figure 2:
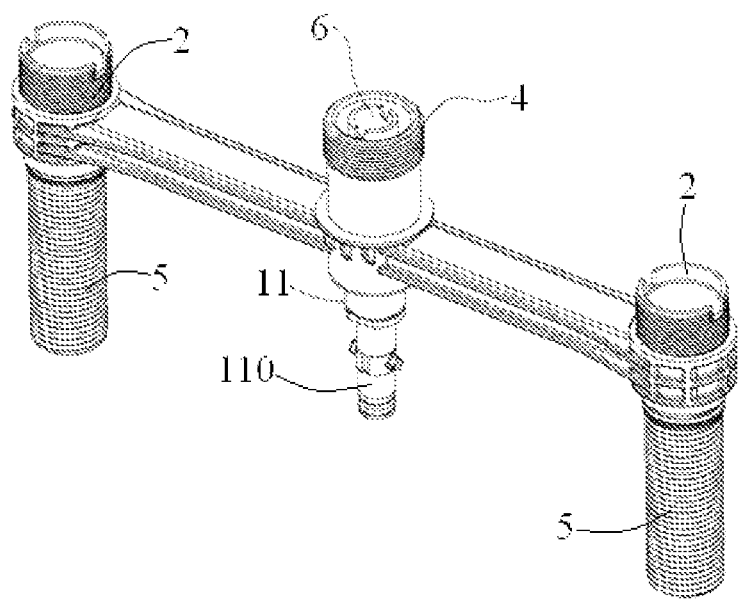
FIG. 2 depicts an exemplary assembled view of the valve body of a water faucet according to one embodiment of the present invention.

Referring to FIGS. 1 and 2, a valve body of a water faucet according to one embodiment of the present invention includes a water outlet pipe seat 1, a water outlet pipe connecting seat 4 disposed in a middle portion of the water outlet pipe seat 1, a hot water and a cold water valve seats 2 at two ends of the water outlet pipe seat 1, and two copper casing pipes 5 connected to the hot water and the cold water valve seats 2 respectively. Since the hot water seat and the cold water seat have same structures except being connected to different external water pipes, in the following description, the hot water seat and the cold water seat will not be distinguished and are generally named as valve seat 2.

The water outlet pipe seat 1 is a single injection molded component which includes a joint seat 10 at a middle portion thereof and two water pipes 100, i.e. a hot water pipe and a cold water pipe, connected to two ends of the joint seat 10 respectively. The joint seat 10 can be connected to various kinds of change valves, such as the change valve assembly 6 as illustrated in FIG. 1. The joint seat 10 is formed with a nozzle connecting end 11. The nozzle connecting end 11 is configured to be a connector defining internal thread and can be connected to a nozzle via thread connection. In order to be coupled to a nozzle readily, the nozzle connecting end 11 of the joint seat 10 is preferably configured to be a connector defining internal thread, and a nozzle connecting assembly 110 is provided.

Figure 3:
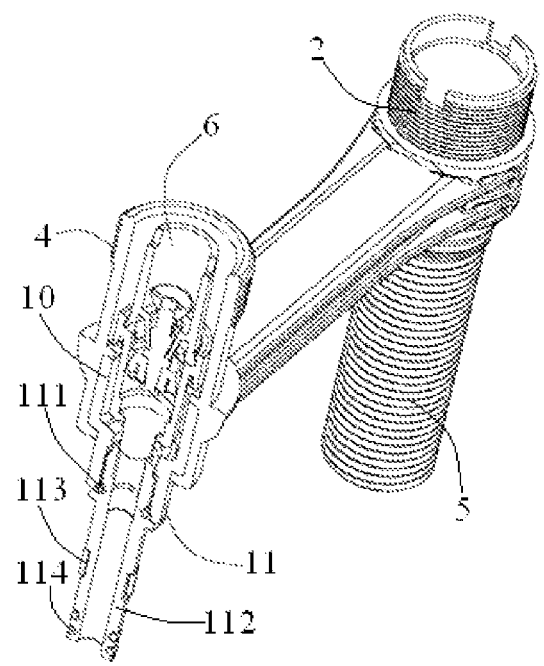
FIG. 3 depicts an exemplary part sectional view of an assembled valve body of a water faucet according to one embodiment of the present invention.

Referring to FIGS. 1 to 3, the nozzle connecting assembly 110 includes a connecting pipe 112, a resilient snapping component 113 and two seal rings 111, 114. One end of the connecting pipe 112 configured to connect with the valve seat defines an external thread corresponding to internal thread of the nozzle connecting end 11, so as to be connected to the nozzle connecting end 11 via thread connection and realize desirable sealing performance via an O-shaped sealing gasket 111. One end of the connecting pipe 112 which is configured to connect the nozzle connecting end 11 defines a receiving recess 115 and a receiving slot. The resilient snapping component 113 is a C-shaped ring forming two snapping blocks 116 on an outer sidewall thereof. The resilient snapping component 113 is set around the connecting pipe 112 and seated in the receiving recess 115. The two seal rings 114 are correspondingly seated in a receiving slot at one end of the connecting pipe 112 for connecting the nozzle connecting end 11.

When being connected to a nozzle, the nozzle is set around the connecting pipe 112. The resilient snapping component 113 deforms inwardly and is squeezed into the receiving recess 115 due to the pressure of the nozzle. When the nozzle slides along the connecting pipe 112 for a certain distance, snapping slots defined in the nozzle register with the two snapping blocks 116 of the resilient snapping component 113. The snapping blocks 116 protrude into the snapping slots of the nozzle due to the resilient force of the resilient snapping component 113, so as to connect the nozzle to the connecting pipe 112. In this case, the two seal rings 114 are sandwiched between the nozzle and the connecting pipe 112. When the nozzle is disconnected from the connecting pipe 112, the snapping blocks 116 are pressed down, and the nozzle can be disconnected from the connecting pipe 112 due to the deformation of the resilient snapping component 113.

The water outlet pipe connecting seat 4 is configured to receive the joint seat 10 of the water outlet pipe seat 1 and connect the water outlet pipe. Structure of the water outlet pipe connecting seat 4 is illustrated in FIG. 1 and will not be detailed further in the description.

Figure 4:
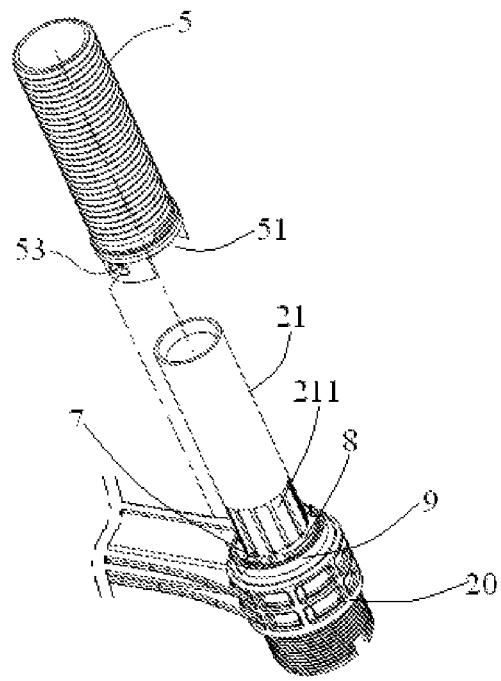
FIG. 4 depicts an exemplary enlarged view of a valve seat and a copper casing pipe of the valve body of a water faucet according to one embodiment of the present invention.
Figure 5:
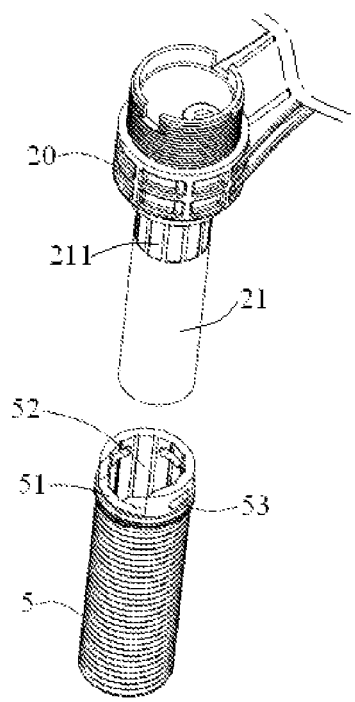
FIG. 5 depicts another exemplary enlarged view of the valve seat and the copper casing pipe of the valve body of a water faucet according to one embodiment of the present invention.

Referring to FIGS. 1, 4 and 5, each valve seat 2 includes a valve cartridge receiving portion 20 configured to receive a valve cartridge and a water inlet pipe 21 in communication with the valve cartridge receiving portion 20. The hot water/cold water valve cartridge each is received in a valve cartridge receiving portion 20 correspondingly. The water inlet pipe 21 is in communication with the valve cartridge receiving portion 20 via an inlet hole 22. The inlet hole 22 is a concentric hole or an eccentric hole. The valve cartridge receiving portion 20 is provided with an annular cylinder 9 set around the water inlet pipe 21 at the juncture of the water inlet pipe 21 and the valve cartridge receiving portion 20. A connecting post 7 and a positioning block 8 are disposed in a space between the annular cylinder 9 and the water inlet pipe 21. The positioning block 8 and the connecting post 7 are separated from each other. The water inlet pipe 21 defines a number of positioning slots 211 at an outer sidewall thereof adjacent to the valve cartridge receiving portion 20.

Each copper casing pipe 5 defines a positioning notch 51 and at least one connecting holes 53 at one end thereof connecting the valve seat 2. The positioning notch 51 is a radial positioning notch corresponding to the positioning block 8 of the valve seat 2. The connecting hole 53 is a radial hole extending through the sidewall of the copper casing pipe 5. Number and size of the connecting holes 53 correspond to number and size of the connecting post 7 of the valve seat 2. The copper casing pipe 5 is formed with a number of protrusions 52 on an inner sidewall thereof adjacent to one end thereof configured to connect the valve seat 2. Number and size of the protrusions 52 correspond to the number and size of the positioning slots 211 of the water inlet pipe 21.

Figure 6:
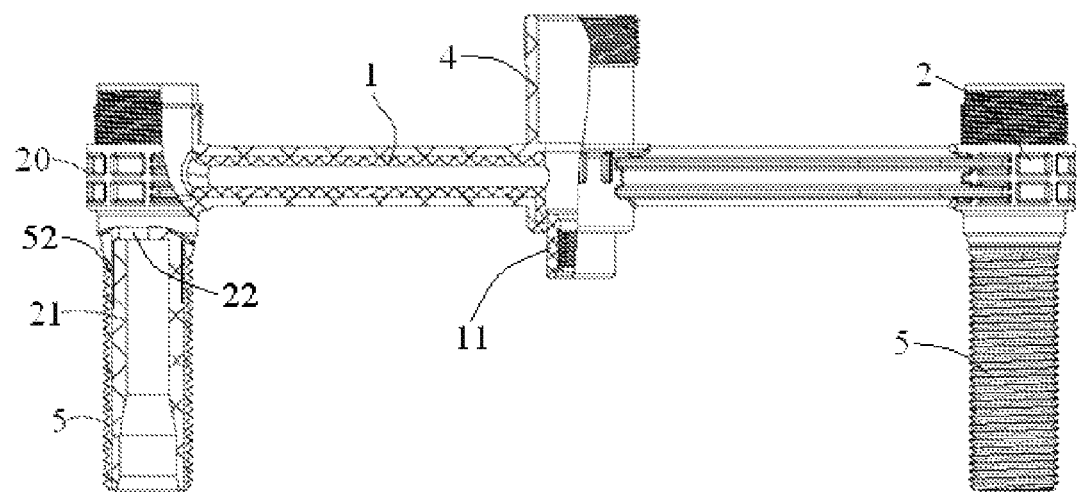
FIG. 6 depicts an exemplary over molding structure of the valve body of a water faucet according to one embodiment of the present invention.
Figure 7:
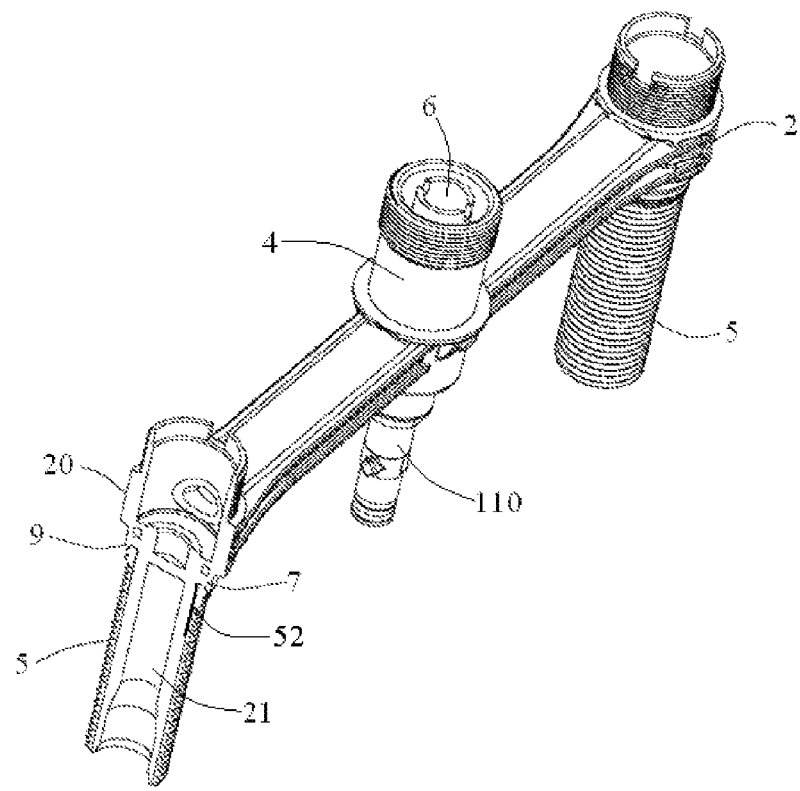
FIG. 7 depicts an exemplary cross-sectional view of the valve seat and the copper casing pipe of the valve body of a water faucet according to one embodiment of the present invention.

Referring to FIGS. 6 and 7, a method for manufacturing a valve body of a water faucet according to one embodiment of the present invention includes the steps of: setting a water outlet pipe seat 1 and two copper casing pipes 5 as mold insert in an injection mold, and obtaining an over molded component including two valve seats 2 and the water outlet pipe connecting seat 4 via over molding, the over molded component enclosing the water outlet pipe seat 1 and two water inlet pipes 21 being inserted into a corresponding copper casing pipe 5 defining external thread and being secured to the copper casing pipe 5 via injection molding. In this case, one end of the copper casing pipe 5 connected to the valve seat 2 is inserted and sandwiched in the space between the annular cylinder 9 of the valve seat 2 and the water inlet pipe 21, with the positioning notch 51 thereof engaging with the positioning block 8 of the valve seat 2, the protrusion 52 engaging with the recess 211 of the valve seat 2. The connecting post 7, two ends thereof being connected to the hot water inlet pipe 21 and the annular cylinder 9 respectively, extends through the connecting hole 53 of the copper casing pipe 5, thereby securing the copper casing pipe 5 to outside of the water inlet pipe 21 of the valve seat 2. Then, a hot water valve cartridge, a cold water valve cartridge, a change valve assembly 6, a nozzle connecting assembly 110 are assembled correspondingly.

Compared with the prior art, the valve body of a water faucet according to the embodiment of the present invention is formed with a copper casing pipe 5 around each water inlet pipe 21 and is connected to an external water pipe via the copper casing pipe 5. Therefore, damage to the external thread of the water inlet pipe of the valve body of the water faucet is avoided, and a lifespan of the water faucet is remarkably prolonged. In addition, the nozzle connecting end 11 of the water outlet pipe seat 1 is configured to be a connector defining internal thread. A clip-on nozzle connecting assembly 110 which can be suitably coupled to the nozzle connecting end 11 is provided. Therefore, the nozzle can be assembled and disassembled quickly.

While the present invention has been illustrated by the above description of the preferred embodiments thereof, while the preferred embodiments have been described in considerable detail, it is not intended to restrict or in any way to limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A valve body of a water faucet, comprising:
    a water outlet pipe seat; and
    two water valve seats configured to receive a cold water valve cartridge and a hot water valve cartridge respectively at two sides of the water outlet pipe seat,
    wherein each valve seat is formed with a water inlet pipe, each water inlet pipe is formed with a cooper casing pipe set around, and each valve seat is fixed to a corresponding copper casing pipe via injection molding,
    wherein each valve seat comprises a valve cartridge receiving portion for receiving a valve cartridge and a water inlet pipe in communication with the valve cartridge receiving portion via an inlet hole, an annular cylinder enclosing the water inlet pipe is provided at a juncture of the valve cartridge receiving portion and the water inlet pipe, and one end of the copper casing pipe connected to the valve seat is inserted and sandwiched in a space between the annular cylinder and the water inlet pipe; and
    wherein the water inlet pipe defines a plurality of positioning slots at an outer sidewall thereof adjacent to the valve cartridge receiving portion, the copper casing pipe is formed with a plurality of protrusions on an inner sidewall thereof adjacent to one end thereof configured to connect the valve seat, and each protrusion is suitably embedded in a corresponding positioning slot.

2. The valve body of a water faucet of claim 1, wherein the copper casing pipe defines an external thread.

3. The valve body of a water faucet of claim 1, wherein the copper casing pipe defines at least one radial connecting holes extending through a sidewall thereof at one end thereof connected to the valve seat, at least one connecting post is seated in a space between the annular cylinder and the water inlet pipe, number and size of the connecting post is corresponding to number and size of the radial connecting holes in the copper casing pipe, and the connecting post extends through the connecting hole with two ends thereof fixed to a hot water inlet pipe and the annular cylinder respectively.

4. The valve body of a water faucet of claim 1, wherein the copper casing pipe defines at least one radial positioning notch at one end thereof connected to the valve seat, at least one positioning blocks is correspondingly formed in a space between the annular cylinder and the water inlet pipe, number and size of the positioning blocks correspond to number and size of the positioning notches of the copper casing pipe, each positioning block is suitably fitted with a corresponding positioning notch.

5. The valve body of a water faucet of claim 1, further comprising a water outlet pipe connecting seat at a middle portion of the water outlet pipe seat, the water outlet pipe connecting seat and the two valve seats are over molded using the water pipe outlet seat and the copper casing pipe as mold insert.

6. The valve body of a water faucet of claim 1, wherein the water outlet pipe seat is coupled with a clip-on nozzle connecting assembly configured for quickly connecting or disconnecting the nozzle.

7. The valve body of a water faucet of claim 6, wherein the water outlet pipe seat is a single injection molded component comprising a joint seat at a middle portion thereof and two water pipes connected to two sides of the joint seat respectively, a nozzle connecting end of the joint seat is formed with a connector defining an internal thread, the nozzle connecting assembly is connected to the connector defining internal thread of the water outlet pipe seat via thread connection and sealed via a seal ring.

8. The valve body of a water faucet of claim 6, wherein the nozzle connecting assembly comprises a connecting pipe, a resilient snapping component and a seal ring, one end of the connecting pipe configured to connect the valve seat is fixed to the nozzle connecting end of the water outlet pipe seat, the nozzle connecting end of the connecting pipe is provided with a receiving recess and a receiving slot, the resilient snapping component is a C-shaped ring being formed with two snapping blocks on an outer sidewall thereof, the resilient snapping component is set around the nozzle connecting end of the connecting pipe and seated in the receiving recess, and the seal ring is correspondingly seated in a receiving slot at the nozzle connecting end of the connecting pipe.

* * * * *